United States Patent [19]
Chiang et al.

[11] Patent Number: 5,535,021
[45] Date of Patent: Jul. 9, 1996

[54] SCANNER LIGHT DIFFUSER

[75] Inventors: Don-Kai Chiang; Roger F. Huang, both of Hsinchu, Taiwan

[73] Assignee: Microtek International, Inc., Hsinchu, Taiwan

[21] Appl. No.: 254,236

[22] Filed: Jun. 6, 1994

[51] Int. Cl.⁶ .................................................. H04N 1/04
[52] U.S. Cl. ........................................ 358/474; 358/475
[58] Field of Search .................................. 358/474, 475, 358/476; 359/599, 707; 355/228, 229; 362/246; H04N 1/04

[56] References Cited

U.S. PATENT DOCUMENTS

| | | |
|---|---|---|
| 4,920,421 | 4/1990 | Stemmle . |
| 4,987,499 | 1/1991 | Kimura ................................. 358/474 |
| 5,187,595 | 2/1993 | Kitani et al. ........................... 358/475 |

Primary Examiner—Kim Yen Vu
Attorney, Agent, or Firm—Small, Larkin & Kidde

[57] ABSTRACT

A self-adjusting, adjustable, light-diffusing mechanism adapted for use in an optical scanner and including a light source to be projected on or transmitted through an object to be scanned, such as a photograph or transparency, including a light-permeable plate extending along the length and width of the light source, and having a varying degree of thickness so as to permit a varying degree of light transmitted therethrough and onto the object to be scanned, and, including a reflector positioned on the side of the light source opposite the light-diffusing mechanism and including at opposed ends of the reflector enlarged, convergent reflecting surfaces which function to focus light from the opposed ends of the light source to a target area so as to make the illumination intensity at the target area substantially uniform throughout the length of the light source, and so as to easily and conveniently adjust and control the degree of illumination projected on or through the object to be scanned.

16 Claims, 8 Drawing Sheets fig.1 fig.2 fig. 3 fig. 4 fig. 5 fig. 7

SCANNER LIGHT DIFFUSER

BACKGROUND OF THE INVENTION

1. Field of the Invention

The present invention relates to a light diffuser mechanism, and more particularly to an adjustable light diffuser mechanism used in an optical, or image scanner.

2. Description of the Related Art

Conventional image or optical scanners employ a light source which emits light to be projected (i) on a scanned object so that the light is reflected from the scanned object or (ii) transmitted through the scanned object. The reflected or transmitted light then passes through a conventional lens and from there to a charge coupled device (CCD) which in turn transforms the light into a series of electrical signals. Those signals are then processed and ultimately converted into an image output typically displayed on a screen, or printed by a printer.

There are numerous disadvantages associated with conventional light sources for scanners, which disadvantages include:

a. Conventional light sources tend to darken in light intensity from use over time, such as conventional fluorescent light bulbs which darken due to deterioration of the phosphor coating surrounding the interior surface of the bulb that glows in reaction to exposure from ultraviolet radiation. A conventional light source typically cannot be adjusted to compensate for such changes in light intensity, due in part to the fact that the changes do not occur uniformly throughout the light source. The inability to compensate for changes in the light intensity can be compounded where it may be desirable in some scanner applications to adjust the illuminance of scanned objects in order to achieve a desired visual effect. The term "illuminance" being defined as the light intensity per unit area on an intercepting surface at any given point, where "light intensity" is used synonymously with "luminous flux." Therefore, the number of applications available for scanners using a conventional light source can be limited by the various changes in light intensity experienced over time.

b. In scanners operating in a transmission mode, that is, where the light source is projected through the scanned object, such as a film or transparency, overexposure is sometimes a problem. When the light source emits a light of too great an intensity, the corresponding electrical charge measured by the CCD exceeds the operational range of the CCD resulting in saturation. Once the CCD experiences saturation due to overexposure, the sensitivity of the CCD is affected and then is not able to produce accurate electrical signals to identify the various color and intensity characteristics of the light coming from the scanned object. This problem is analogous to the problem of photographic film being overexposed because too much light is allowed the pass through the camera lens to the film and, consequently, overexposure produces a finished transparency or picture in which the various colors and intensity of colors on the image are washed out or obliterated. The aforementioned overexposure problem can be overcome by known methods which include (i) increasing the distance between the light source and the scanned object and/or (ii) using a light source having a reduced light intensity. However, these methods are impractical or not economical for several reasons. First, the scanner has a certain, limited size. Therefore, increasing or decreasing the distance between the light source and the scanned object is, for a given scanner design, impractical or impossible. Second, although a voltage regulator, operating as a dimmer, could be used to reduce the voltage across the lamp thereby reducing the intensity of light generated, the inclusion of a voltage regulator in a scanner would increase the number of electrical components and production costs of a scanner, without providing corresponding value in adjustability.

c. Conventional scanners typically use a long, cylindrical fluorescent lamp which projects light waves radially away from the lengthwise axis of the lamp. The light waves, intercepting the scanned object, eventually travel through a lens and finally intercept the CCD. Those skilled in the art will appreciate that the light waves traveling the shortest distance from the lamp to the CCD may have an appreciably greater light intensity than the light waves travelling the farthest distance from the lamp to the CCD. For scanner configurations where the lens and CCD are all centered with respect to the mid-point of the lengthwise axis of the florescent lamp, the light waves generated at the lengthwise ends of the florescent lamp travel the greatest distance through the lens to the CCD and therefore have a relatively weaker light intensity upon intercepting the CCD. The problem is that the CCD's optimum exposure time for recording light waves from the scanned object is not uniform and is greater for light waves traveling from the ends of the florescent lamp.

d. In conventional scanner designs, the distances the light waves travel from the light source to the CCD, the size of the lens, and the sensitivity of the CCD may vary depending upon the intended application of the scanner. It will be appreciated by those skilled in the art that such configuration variations can compound the problems associated with the illuminance of the scanned object as recorded by the CCD.

OBJECTS AND SUMMARY OF THE INVENTION

In an attempt to solve or reduce the above mentioned problems associated with conventional light sources used in conventional scanners, it is an object of the present invention to provide an adjustable, light diffusing device for easily and conveniently adjusting the intensity of a light to obtain a desired illuminance of the scanned object.

It is a further object of the present invention to provide an adjustable, light diffusing device for obtaining uniform illuminance from the light source in a scanner.

Another object of the present invention is to provide an adjustable, light diffusing device for easily controlling the illumination resulting from the light source used in a scanner.

In accordance with one aspect of the present invention, an adjustable, light diffusing device is adapted for use in a scanner and includes a scanner body with mounted therein a light source for emitting therefrom a light capable of being projected to and/or through an object to be mounted in the scanner body, the adjustable, light diffusing device being mounted in the body and positioned between the light source and the scanned object. In operation, the adjustable, light diffusing device is operable to vary the intensity of light projected upon or through the object to be scanned.

The adjustable, light diffusing device of the present invention includes an adjustable light diffusing piece or member mounted between the light source and the object to be scanned and operable to adjust the intensity of light by permitting the light source and the light diffusing device to be moved relative to each other. The adjustable light diffusing piece includes a portion of or is entirely made of tiered plates to form a structure that has a gradually increasing thickness from one end to the other, whereby the degree of intensity of light passing through the member varies according to the thickness of the member through which the light is passed. The adjustable, light diffusing piece or member also includes at least one set of at least two plates, or sections, which are of different sizes and thicknesses, arranged and positioned adjacent to each other so that the intensity of the light passing through a given first portion of the set would be different than the intensity of light passing through a second portion of the set. The plates may be constructed as physically separate members and then joined together, or may be integrally formed so that there is a stair-step appearance from the side. The plates may vary in size and thickness. The adjustable light diffusing piece or member is also made of a light transmissive material, preferably acrylic or a frosted glass.

The light diffusing device of the present invention and the light source itself may be mounted on a light source seat, and the light diffusing device and/or light source may be moved within the housing, relative to each other.

The present invention also includes a light receiving device which may include a lens and mirrors for receiving the reflected/transmitted light and a CCD apparatus for converting the light into a series of electrical signals, in a conventional manner. The series of electrical signals is then processed in a conventional manner to obtain a reproduced image. Typically the conventional processing in a scanner is performed by a Central Processing Unit (CPU). The light receiving device, including the lens and CCD apparatus, may also be mounted on a receiving device seat, and the assembly is, optionally, movable relative to the object to be scanned and the light diffusing device.

The preferred light source in the present invention is a conventional fluorescent lamp of the type and size used in conventional scanners. The adjustable, light diffusing device also incorporates a reflector at each of its two ends, respectively mounted about the two ends of the fluorescent lamp. The end reflectors function to increase the brightness of the light from the ends of the fluorescent bulb by focusing the radially emitted light in the direction of the object to be scanned, and thus to make the intensity of projected light more even throughout the length of the lamp.

In accordance with another aspect of the invention, the preferred light source includes an adjustable light source which includes light transmitting conduits for selectively transmitting projected light uniformly along the viewing region of the CCD apparatus. The adjustable light source may operate independently, but preferably cooperates with the conventional fluorescent lamp. In a preferred embodiment, the adjustable light source is located remotely away from the conventional lamp. Flexible light transmitting conduits transmit the light from the adjustable light source for projecting light at selected locations along the conventional lamp. The adjustable light source functions to increase the brightness of the light along the darker regions of the fluorescent bulb.

In an alternative embodiment of the present invention, the adjustable, light diffusing device includes an adjustable, light diffusing piece mounted below the light source for adjusting, to a desired degree, the intensity of light by adapting the light source to be moved relative to the light diffusing piece. In this embodiment, the light source may be mounted on a reflecting piece which in turn is movably mounted on the scanner body.

BRIEF DESCRIPTION OF THE DRAWING(S)

The objects and advantages of the present invention will become more readily apparent to those ordinarily skilled in the art after reviewing the following detailed description and accompanying drawings, wherein.

DESCRIPTION OF THE PREFERRED EMBODIMENT(S)

Figures 1, 2:
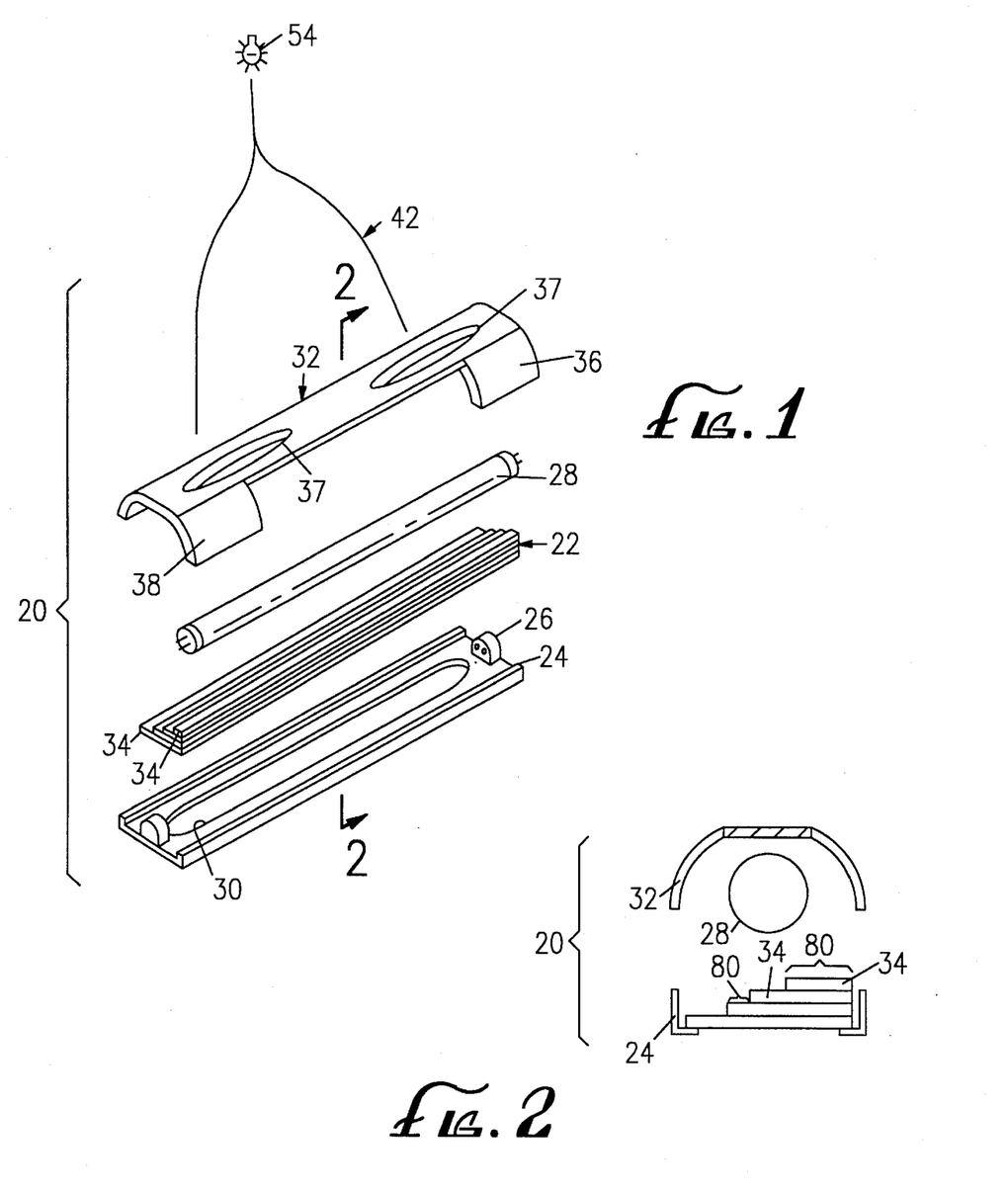
FIG. 1 is a exploded, perspective view of a first embodiment of the present invention showing a stair-step type light diffusing piece.
FIG. 2 is a cross-sectional view showing the FIG. 1 embodiment, taken along line 2—2.
Figure 3:
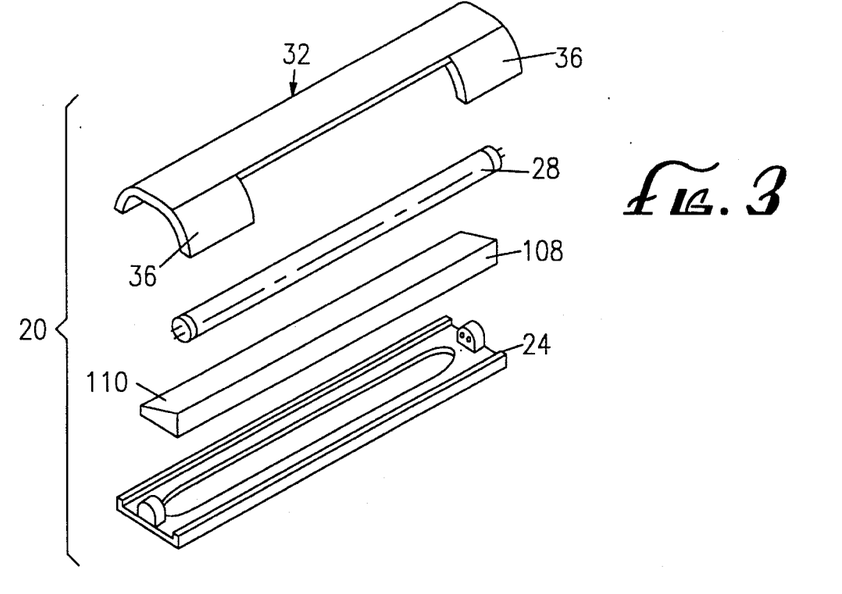
FIG. 3 is an exploded, perspective view showing a second embodiment of the present invention, having a light diffusing piece with a gradually increasing thickness.

Referring to FIGS. 1, 2 and 3, an adjustable, light diffusing device 20 includes generally an adjustable, light diffusing member 22 overlying and supported by a light adjusting seat 24. The seat 24 includes sockets 26 which extend perpendicularly away from the seat above the light diffusing member 22 for supporting a light source 28 and aperture 30 for directing light onto an object to be scanned below the seat 24. The light source 28 is preferably a conventional tubular fluorescent lamp which overlies the light diffusing member 22. A light converging reflector or reflecting piece 32, configured in a manner to direct radiating light from the light source 28 in a direction towards the light diffusing member, overlies the light source 28.

The light diffusing member 22 (FIGS. 1 and 2) is comprised of a plurality of rectangular plates 34 with light diffusing properties for transmitting light from the light source 28 through the seat aperture 30. The rectangular plates 34 are preferably formed from acrylic or frosted glass, however any light-permeable, diffusing material maybe used. The plates 34 each have the same length and thickness, however the widths vary incrementally in size. The plates 34 are stacked one on top of the other along one side in descending size such that they form a right-angled triangle where the hypotenuse consists of a tiered, stair-step slope having discrete increments in thickness (FIG. 2). The plates 34 may be connected in any conventional manner so long as the light permeable and diffusing properties of the plates remain unchanged. The plates 34 each may be manufactured from different materials so that when they are layered together, the light permeates through the different layers to produced a desired light diffusing effect.

The adjustable, diffusing device further includes a reflecting piece 32, having apertures 37 in a mid-section and ends 36 and 38 respectively mounted at the two ends of the fluorescent lamp 28. The two ends 36 and 38 of the reflector 22 are configured at a greater degree of arc in order to reflect and converge or focus the light from the lamp 28 to a locus of points in the direction of the object to be scanned. The two ends increase the light intensity which is normally weaker at the end points on the lamp. In this way the problem of uneven illuminance of the object is minimized or prevented.

The preferred embodiment further includes an adjustable, supplemental light source 40 (FIG. 10) connected within the scanner housing in order to supplement the weak light portions of the fluorescent lamp. A light transmissive conduit 42 having a trunk 44, which forks into two branches 46 and 48 and connects through the apertures 37 (FIG. 1) in the reflecting piece proximate the supplemental light source 40. The respective branches 46 and 48 terminate proximate to the respective ends 50 and 52 of the lamp 28 for transmitting light from the supplemental light source to the lamp ends to increase the light directed at the object to be scanned.

Figure 10:
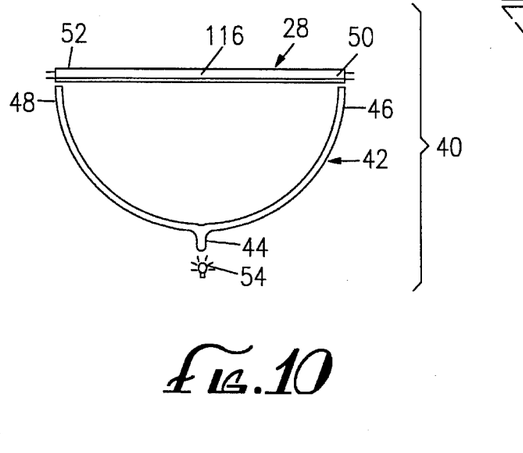
FIG. 10 is a schematic view showing an adjustable light source according to the present invention.

The supplemental light source 40 is preferably a conventional incandescent light bulb 54. The bulb is mounted within the scanner housing in a conventional lamp socket (not shown). The transmissive conduit 42 may consist of flexible bundled glass fiber optic cable or some other commercially available flexible material capable of transmitting light.

In the exemplary embodiment, the transmissive conduit 42 is of the tube type manufactured by FOSTEK of Auburn, N.Y., U.S.A. This conduit exhibits the preferred transmissive properties which when positioned at the accepted angle to the light bulb 54, the light is totally reflected in the cable with out loss of light. Furthermore, when the light bulb 54 is located away from the lamp 28, the conduit must flex in order to transmit the light as the lamp 28 moves through the scanner housing with respect to the supplemental light source.

Figure 8A:
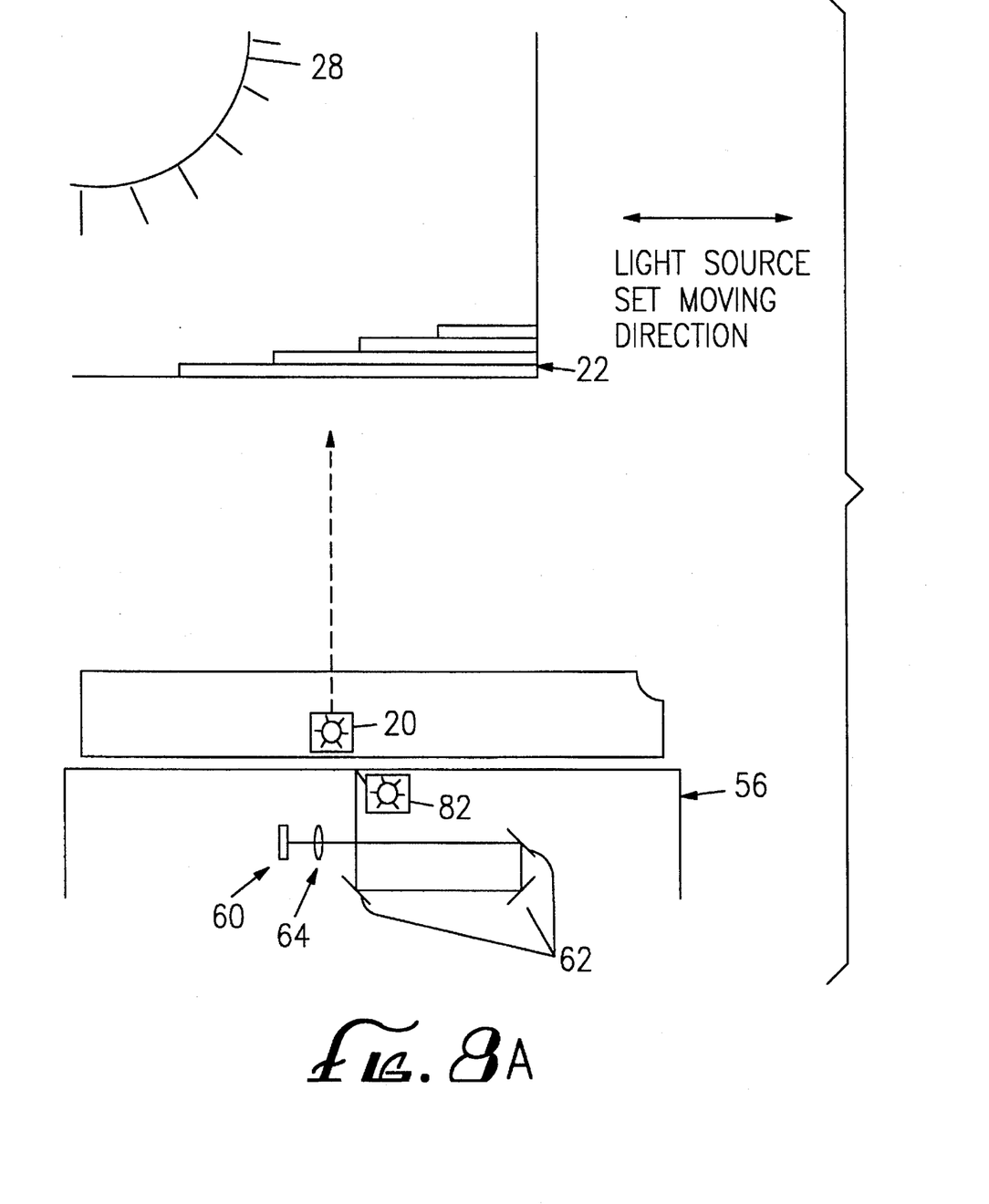
FIGS. 8A–E are diagrammatic side views of light diffusing device the present invention with respect to a light receiving device.

The light diffusing device 20 is positioned in a scanner housing or scanner body 56 (FIG. 8A) in the same manner as conventional light sources. For transmissive scanner devices, the light diffusing device 20 is positioned to transmit light through the aperture 30 in the seat 24 above the object to be scanned. The illuminance of the transmissive material is then intercepted by an optical receiving device 58 (FIG. 5) positioned below the object to be scanned within a receiving device seat 59. Typically, the conventional receiving device 58 consists optically of a CCD apparatus 60 for intercepting the light, mirrors 62 to direct light from the object at the CCD apparatus 60 and a lens 64 to focus the illuminance from the object to be scanned upon the CCD apparatus 60.

Figure 5:
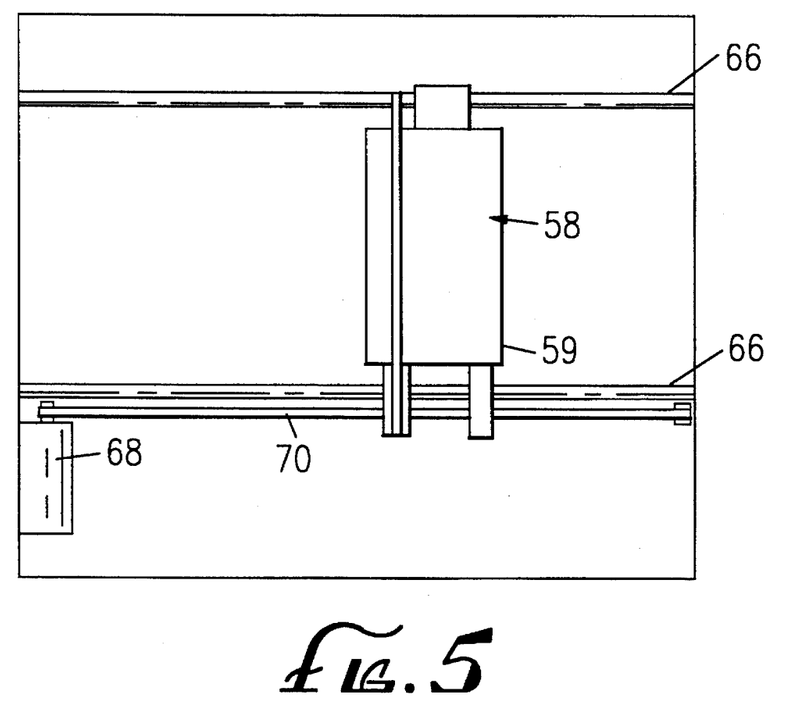
FIG. 5 is a schematic, top view illustrating a receiving device of the present invention positioned in the scanner body and adapted for translation.
Figure 9:
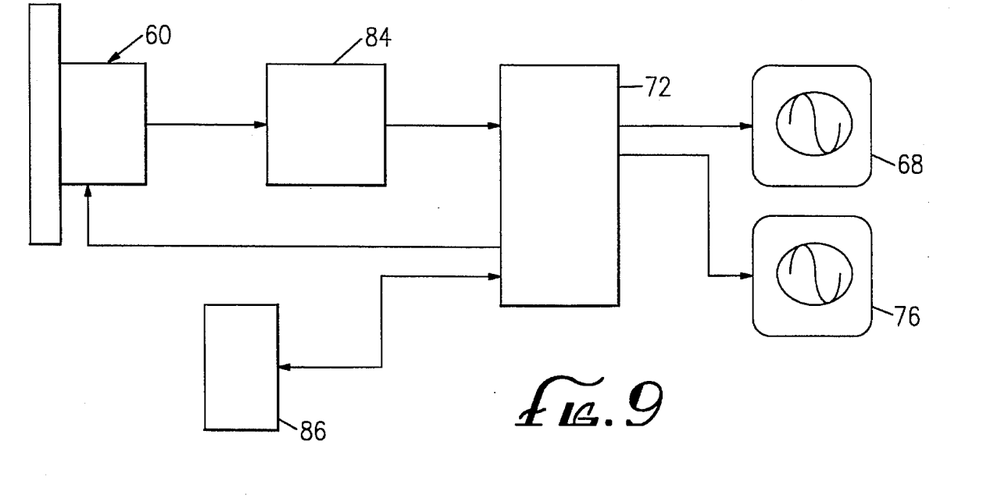
FIG. 9 is a block diagram showing connection of the CPU to the present invention.

Referring to FIG. 5, the optical receiving device seat 59 is movably located on a pair of latitudinal, opposing, parallel rails 66 along which the receiving device rides. A conventional stepper motor 68 drives a belt 70 to which the optical receiving device seat 59 is attached for propelling the optical receiving device 58 incrementally across the rails 66 thereby incrementally exposing portions of the object to be scanned to the viewing field of the CCD apparatus 60. A central processing unit (CPU) 52 (FIG. 9) is located within the scanner and electrically connects to the light receiving device 58 and drive motor 68 in a conventional manner for scanning each line and incrementally energizing the receiving device drive motor 68 to thereby incrementally propel the receiving device along the rails 66 after each line is scanned.

Figure 4:
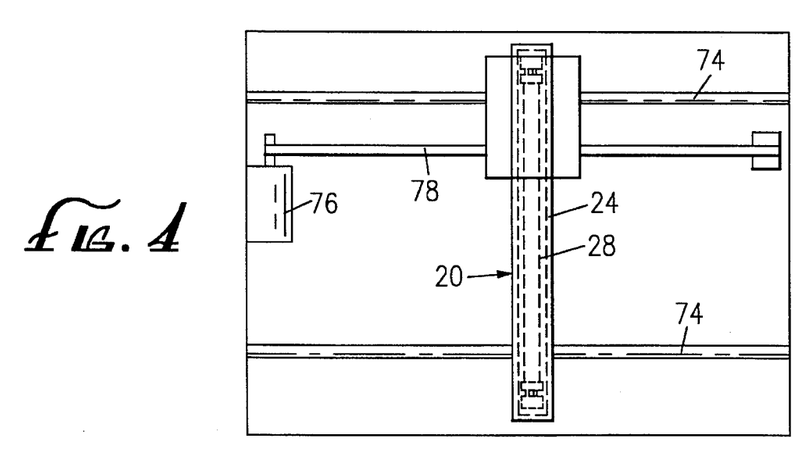
FIG. 4 is a schematic, top view showing an adjustable, light diffusing device according to the present invention positioned in the scanner body and adapted for translation.

Referring to FIG. 4, the light diffusing device 20 is movably located on a second pair of latitudinal, opposing parallel rails 74 for moving the light diffusing device 20 in the same latitudinal direction as the light receiving device 58. A second stepper motor 76 drives a second belt 78 mounted on the light diffusing device to move the light diffusing device 20 in a parallel latitudinal path above the light receiving device 58. The CPU 72 (FIG. 9) connects electrically with the light diffusing device drive motor 76 for propelling the light diffusing device 20 incrementally along the object in parallel adjusted alignment with the incremental movement of the light receiving device 58.

The light receiving seat also includes a conventional reflective light source 82 for reflecting light off of a light reflecting material such as a photograph (not shown). The second light source 82 may be connected within the light receiving seat 59 in any conventional manner for such a light source. When activated, the second light source 82 projects light upon the light reflecting object and the illuminance of the reflective object is perceived by the CCD apparatus 60. The light reflective object is preferably provided by the user and selected for the desired application; however, a light reflective reference (not shown), such as an opaque bar located at a top or bottom margin, may also be provided at one of the ends of the rails. The second light source 82 may be used to scan reflective objects, but may also be used as a reference light source to allow the scanner to self-adjust the light intensity of the light diffusing device 20.

The CCD apparatus 60 (FIG. 9) electrically connects to the CPU 72 in a conventional manner through a conventional analog to digital convertor 84 such that analog signals sent from the CCD apparatus are converted into a digital form useable by the CPU. A memory 86, preferably consisting of an electrically erasable programmable read only memory (EEPROM) connects to the CPU 72 through a data/address bus in a conventional manner.

OPERATION

Figure 11:
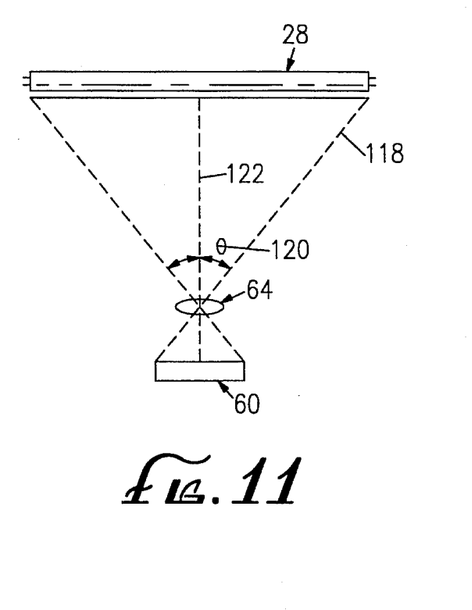
FIG. 11 is a diagrammatic view showing the transmission of light to the CCD apparatus according to the present invention.

In operation, the light source is pre-adjusted preferably at the factory to place light from the supplemental light source 40 at the appropriate positions along the fluorescent lamp 28 by positioning the ends of the transmissive conduit branches 46 and 48 near the darker ends 50 and 52 of the lamp. As shown in FIG. 11, light transmitted from the ends of the lamp travel along a path 118 at an angle theta 120 with respect to the shortest distance 122 traveled by light through the center focal point of the lens to the CCD apparatus 60.

Light traveling a greater distance will tend to diminish in brightness. Thus the light from the ends 50 and 52 of the lamp must be brighter than the center of the lamp in order to makeup for the loss in light intensity from the greater distance traveled. The light conduits are adjusted along the lamp to account for the dimmer portions of the lamp and to increase the brightness of light transmitted the greatest distance to the CCD apparatus 60. Thus variations in light intensity received by the CCD apparatus 60 are reduced or minimized by the arrangement of the fluorescent lamp, supplemental light source and the reflectors.

Referencing FIGS. 8A–E, the light source projects light across the light diffusing member which consists of several layers of light diffusing plates. Each tier 60 of plates along the light diffusing member 22 project varying degrees of light intensity inversely proportional to the thickness of the tier 60. The relative position of the light diffusing device 20 is adjusted with respect to the field of view of the light receiving device 38 to position any one of the tiers 60 in between thereby adjusting the illuminance of the object intercepted by the light receiving device 58.

Figures 8B, 8C, 8D, 8E:
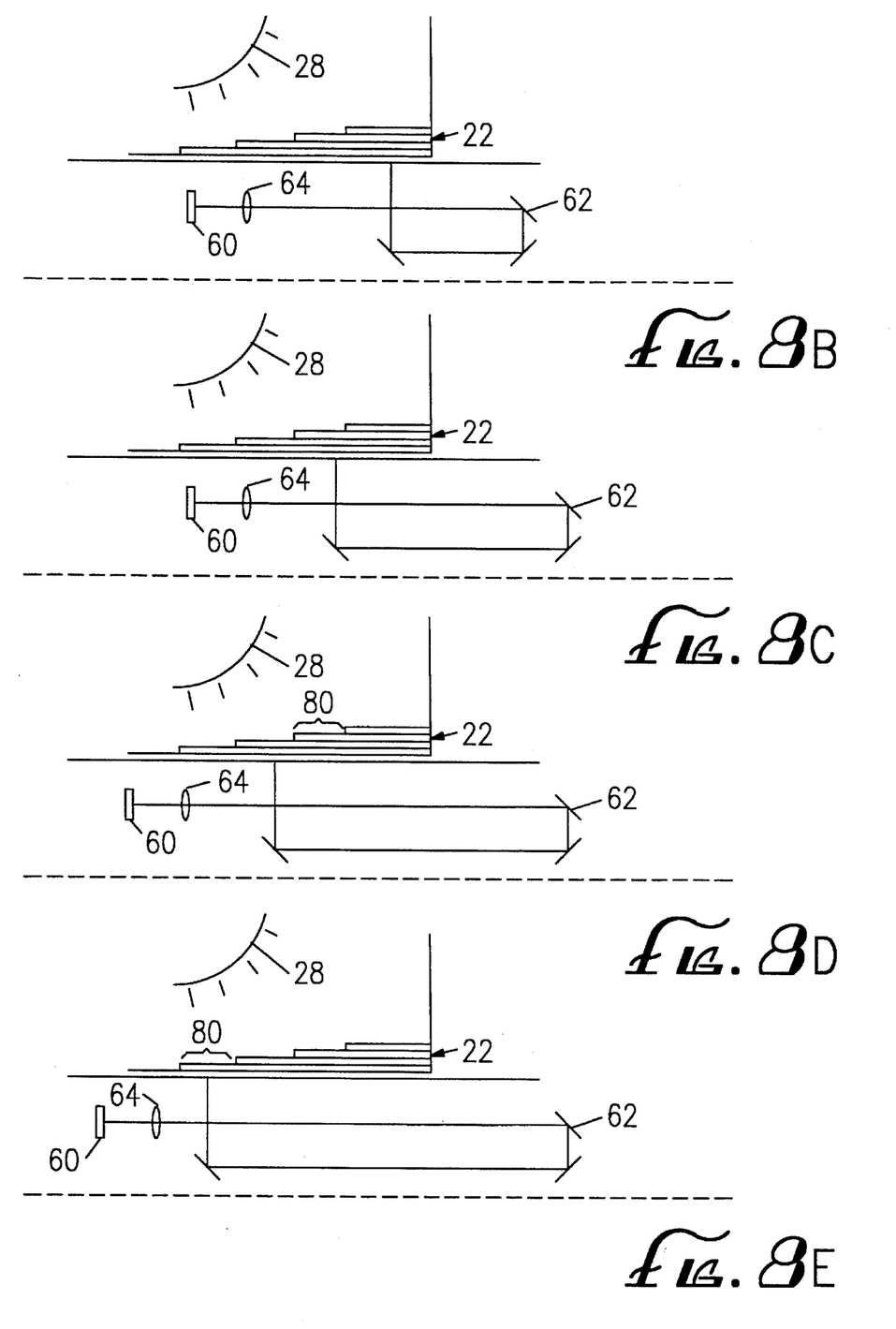

For example when a bright or the brightest light intensity is required, the light diffusing device 20 is positioned over the light receiving device 58 to increase the light intensity as shown in FIGS. 8C and 8B, respectively. When a dim or the dimmest light intensity is required, then the light diffusing device 20 is positioned over the light receiving device 58 to decrease the light intensity as shown in FIGS. 8D and 8E, respectively. Once the relative position of the light diffusing device 20 with respect to the light receiving device 58 has been adjusted to obtain the desired illuminance of the object, the light receiving device 58 and light diffusing device 20 are moved incrementally across the object to be scanned in adjusted alignment with respect to each other.

Once light has been transmitted to the CCD apparatus 60 from either light source, the CCD apparatus 60 (FIG. 9) converts the light provided by the illuminance of the scanned object into useable electric signals in a conventional manner. Briefly, the CCD apparatus 60, electrically connected to the CPU 72 through an analog to digital convertor 84, converts the light into analog electrical signals. The digital to analog convertor 84 converts the signals into digital data useable by the CPU. Digital data is then available to the CPU for use as appropriate to the conventional software used with the scanner.

In determining the proper light intensity for an object to be scanned, the present invention includes a software program 88 executed by the scanner CPU 72 which properly sets the desired light intensity by moving the light diffuser device 20 to adjust the light intensity in comparison to predetermined reference data measured by the second light source 82. The digital signals representative of the illuminance of a scanned object from the second light source 82 may be scanned and stored in memory 86, for example firmware such as an EEPROM. These stored signals may be used as reference data to adjust the light diffusing member 22.

Figure 6:
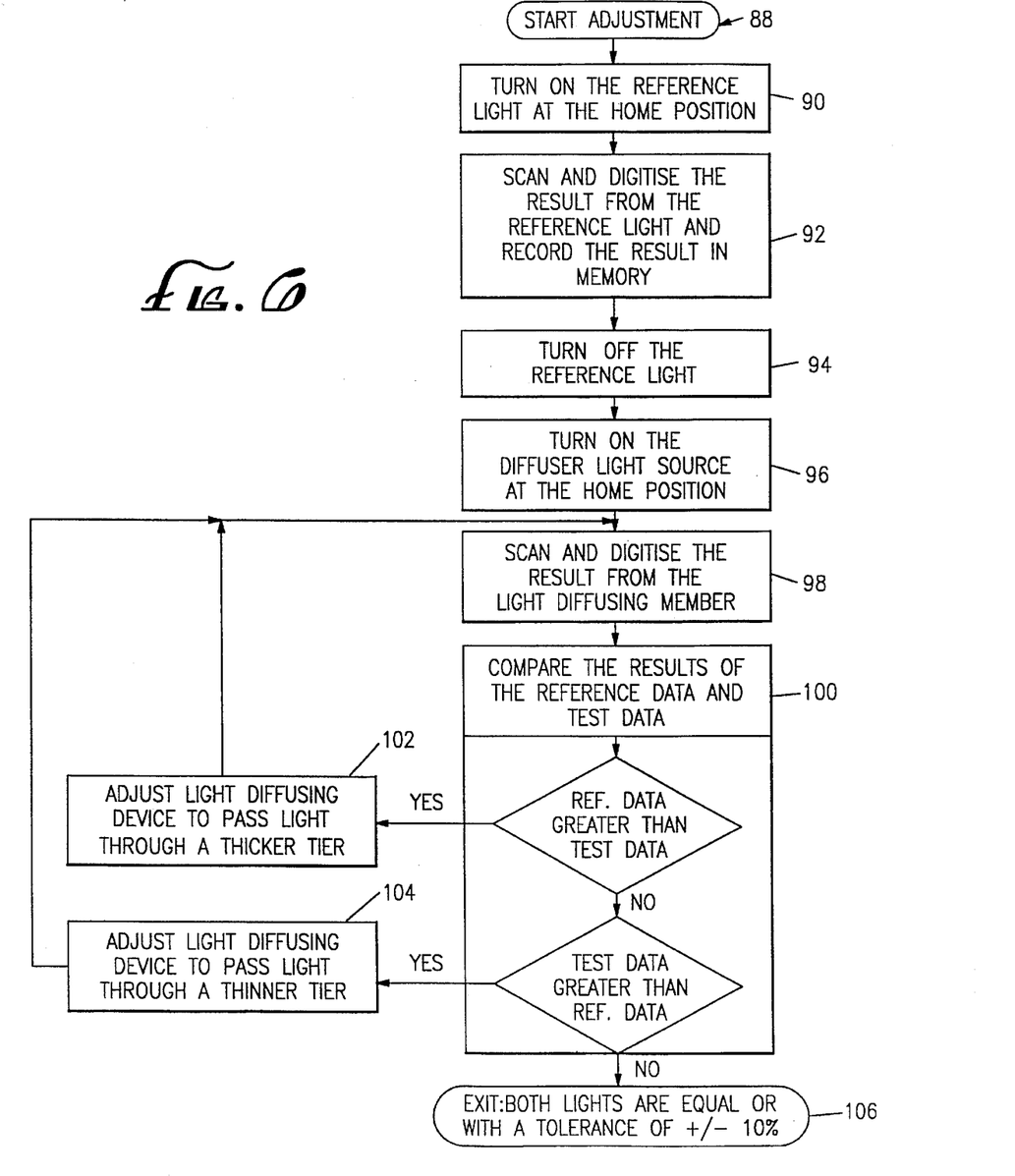
FIG. 6 is a flow chart showing the decision tree regarding how a desired degree of illumination is made in accordance with the present invention.

With reference to the flow chart of FIG. 6, the scanner CPU 72 includes a light intensity program 88 initiated by the main program during power-up of the scanner or by the user through a conventional user interface, such as a display and button panel (not shown). The program adjusts the light intensity from the light diffusing device to obtain the desired illuminance from the scanned object by accomplishing the steps of first turning on 90 the reference light 82 to scan a reflective object preferably provided by the user. The scanned digital signals or reference data are then scanned, digitized and stored 92 in the firmware memory 86 and the reference light source 82 is then turned off 94. In an alternatively preferred embodiment, the reference data is stored in the memory at the time of manufacture and accordingly steps 92 and 94 are then skipped.

Next, the user inserts a light transmissive object to be scanned, such as a film, slide or transparency. The light diffusing device 20 is then turned on 96. The light receiving device 58 then scans and converts 98 a line of the light transmissive object into digital test data, the CPU 72 compares 100 the digital test data to the reference data of the light reflective reference stored in the memory 86.

If the light intensity from the light diffusing member 22 test data is greater than the light reflective reference data then the light diffusing device is adjusted 102 by means of the CPU 72 controlling the second stepper motor 76 to project light through a thicker portion of the light diffusing member 22. The CPU 72 then loops back to the scan convert step 98 to obtain more test data. Alternatively if the light intensity from the light diffusing member 22 test data is less than the light reflective reference data, then the light diffusing device is adjusted 104 by means of the CPU 72 controlling the second stepper motor 76 to project light through a thinner portion of the light diffusing member 22. The CPU 72 then loops back to step 98 to obtain more test data.

When the light intensity from the light diffusing member 22 test data equals or closely approximates the light intensity of the light reference 82, then the CPU 72 exits 106 the self-adjusting program 88 and returns to the conventional main scanner program. Once adjusted the light diffusing device 20 maintains the self-adjusted alignment with respect to the light receiving device 58 until the self adjusting program is initiated again. The above-described operational steps can be programmed using conventional feedback control methods such as the high-low type procedure described or using conventional fuzzy logic feedback routines.

In a second preferred embodiment (FIG. 3), the light diffusing member 108, connected to the light diffusing device 20 in a conventional manner, is formed from a solid plate having a trapezoidal shape when viewed at an end of the plate. The trapezoidal shape provides a linear smooth-sloped surface 110 rather than the stair-stepped surface of the first preferred embodiment.

The light diffusing device having the smooth-sloped light diffusing member 108 may be adjustably aligned with respect to the light receiving member 58 to obtain very fine adjustments in the light intensity projected upon the object to be scanned. The light diffusing member 108 may be formed having a uniform light diffusing material or may contain mixture of light diffusing materials to produce a desired lighting effect.

Figure 7:
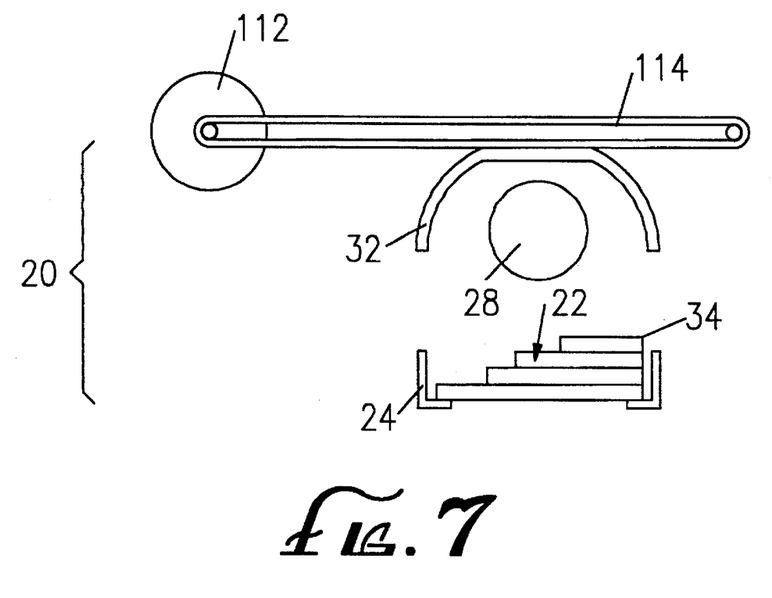
FIG. 7 is the FIG. 2 cross-sectional view further including a schematic showing of the light source and reflecting piece adapted for translation in accordance with the present invention.

In a third preferred embodiment, the light source 28 and light converging reflector piece 22 may be adjusted within the light diffusing device 20 with respect to the light diffusing member in the same direction of movement as the light diffusing member 22 and the light receiving device 58. A third pair of conventional parallel rails or tracks (not shown) may be used to guide the opposing ends of the light source over the light diffusing member. A light source third stepper motor 112 drives a third belt 114 connected rigidly in a conventional manner to the light source to propel the light source along the track with respect to the light diffusing member.

By moving the light source 28 with respect to the light diffusing member 22, the light intensity may be further adjusted in a manner which provides a more uniform distribution of light across the light diffusing member 22. For example when the light diffusing device 20 aligns a thin tier of the light diffusing member 22 to project a strong intensity of light toward the light receiving device, if the lamp 28 is too close to the light diffusing member a strong glow or halo may be perceived by CCD apparatus 60. By moving the light source 28 further away from the light diffusing member, variations in the light intensity may be reduced or prevented.

Figure 12:
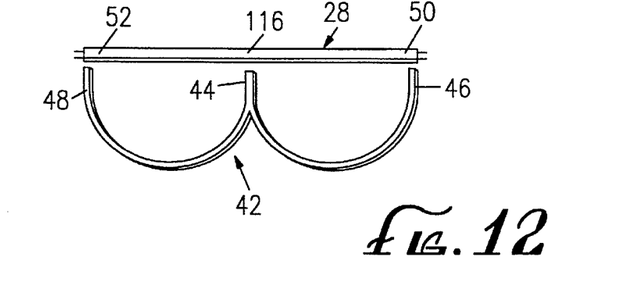
FIG. 12 is a diagrammatic view of an alternative embodiment of the adjustable light source of the present invention.
Figure 13:
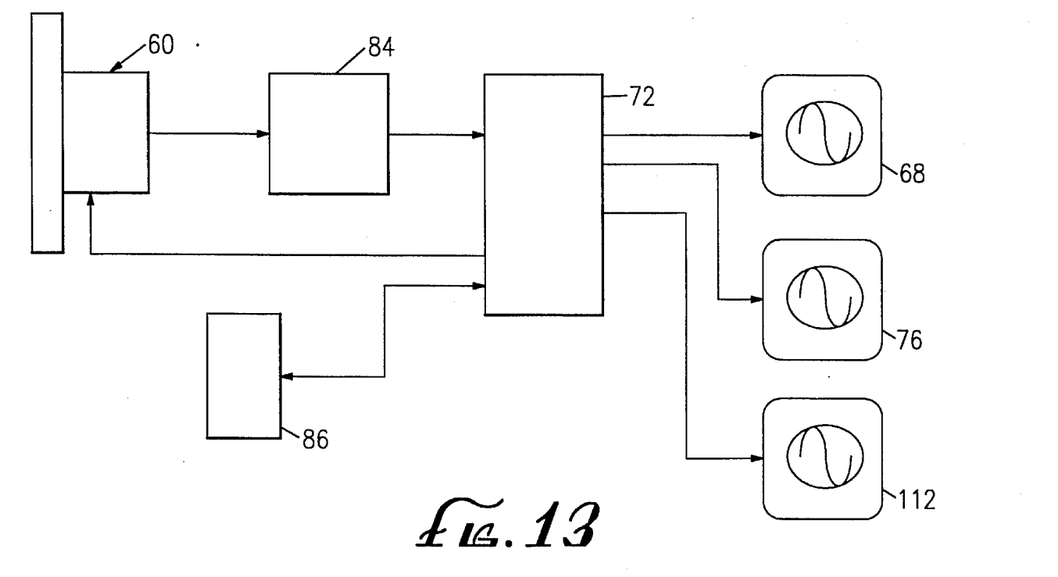
FIG. 13 is a block diagram showing an alternative embodiment of the present invention.

In a fourth preferred embodiment, the supplemental light source (FIG. 12) includes light transmissive conduit having the trunk 44 positioned near the fluorescent lamp 28 for drawing light from the bright center region 116 for projecting light through the conduit near the dimmer lamp ends 50 and 52. Thus the brighter center region 116 of the lamp supplements the light transmitted at the lamp ends 50 and 52.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. An adjustable light-diffusing device adapted for use in a scanner having a scanner body and a light receiving device for generating electrical signals representative of an object to be mounted in said scanner body, said light diffusing device comprising:

a light diffusing seat movably connected to said scanner body proximate to said object;

a light source adapted for use emitting therefrom a light having a predetermined light intensity capable of being projected to intercept said object and to then intercept said light receiving device conveying the illuminance of said object; and an adjustable light diffusing member connected to said light diffusing seat and adapted to transmit light between said light source and said object such that said light to said object is diffused thereby adjusting the illuminance of said object received by said light receiving device.

2. An adjustable-light diffusing device according to claim 1 wherein said adjustable light diffusing member includes means for adjusting said light diffusing seat with respect to said object to thereby adjust the illuminance of said object received by said light receiving device.

3. An adjustable-light diffusing device according to claim 2 wherein said adjustable light diffusing member includes:

a plurality of light diffusing tiers selectively positioned below said light source, each of said tiers adjusting said light intensity such that when positioned between said light source and said light receiving desiredly adjusting said illuminance received by said light receiving device.

4. An adjustable-light diffusing device according to claim 3 wherein said light source electrically connect to said light diffusing seat and said adjusting means adjusts the relative position of said light diffusing seat with respect said object and light receiving device to selectively position at least one of said light diffusing tiers between said light source and said light receiving device.

5. An adjustable-light diffusing device according to claim 3 wherein said light diffusing member includes at least one plate having a gradually increasing widthwise thickness from one side to the other side thereof such that said plurality of tiers is an infinite number of tiers.

6. An adjustable light diffusing device according to claim 3 wherein said light diffusing member includes at least two plates having different widths stacked in descending widths such that said plurality of tiers is a pair of tiers.

7. An adjustable light diffusing device according to claim 6 wherein at least two of said plates are integrally formed.

8. An adjustable light diffusing device according to claim 3 wherein said light diffusing member is made from a light permeable material.

9. An adjustable light diffusing device according to claim 8 wherein said light permeable material is acrylic.

10. An adjustable light diffusing device according to claim 8 wherein said light permeable material is frosted glass.

11. An adjustable light diffusing device according to claim 3 for use in a scanner having a CPU wherein said adjusting means is electrically connected to said CPU and said CPU is operative to signal said adjusting means to position at least one of said tiers between said light source and said light receiving device.

12. An adjustable light diffusing device according to claim 11 for use in a scanner having said CPU connected to said light receiving device through an analog to digital convertor for receiving digital data representative of said electrical signals, said light diffusing device further including:

a memory electrically connected to said CPU for storing reference data;

a light diffusing adjustment program, for execution in said CPU, for interactively receiving test data from said light receiving device representative of the light intensity transmitted through said light diffusing member, to thereby compare said test data to said reference data stored in said memory to determine whether adjustment of said light diffusing member is required, to thereby actuate said adjusting means to move said light diffusing member in response to said comparison;

said adjustment program, upon completion of execution, providing a desired light intensity from said light diffusing member.

13. An adjustable light diffusing device according to claim 11 for use in a scanner having said light receiving device movably connected to said housing upon rails, a light receiving motor connected to said CPU for driving said light receiving device and a drive belt rigidly connected to said light receiving device and coupled to said motor for moving said light receiving device in response to said CPU wherein said adjusting means includes rails for movably connecting said seat to said housing, a diffusing seat motor electrically connected to said CPU and a diffusing seat drive belt rigidly connected to said and coupled to said motor for selectively adjusting said seat by said motor in response to said CPU.

14. An adjustable light diffusing device according to claim 3 wherein said light diffusing device further includes a light source socket for maintaining said light source, rails for movably connecting said light socket to said housing, a light source motor electrically connected to said CPU for adjusting said light source with respect to said seat and said light receiving device, a light source belt rigidly connected to said light source socket and coupled to said motor for adjusting said light source in response to said CPU.

15. An adjustable light diffusing device according to claim 3 wherein said light source connection includes a light reflecting piece located at opposite ends of the light source for directing light upon said object.

16. An adjustable light diffusing device according to claim 3 wherein said light directing piece is a light converging reflector having extended arcuate ends located at respective ends of the light source for directing light upon said light diffusing member.

* * * * *